(12) United States Patent
Pires et al.

(10) Patent No.: US 12,522,148 B2
(45) Date of Patent: Jan. 13, 2026

(54) INTEGRATED HOLDER ASSEMBLY FOR A VEHICLE DOOR

(71) Applicant: Ford Global Technologies, LLC, Dearborn, MI (US)

(72) Inventors: Evelyn Pires, Mexico City (MX); Gabriela Betancourt, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 18/375,106

(22) Filed: Sep. 29, 2023

(65) Prior Publication Data
US 2025/0108764 A1 Apr. 3, 2025

(51) Int. Cl.
*B60R 7/08* (2006.01)
*A47G 25/12* (2006.01)
*B60R 11/00* (2006.01)

(52) U.S. Cl.
CPC ............ *B60R 7/08* (2013.01); *A47G 25/12* (2013.01); *B60R 2011/0021* (2013.01); *B60R 2011/0082* (2013.01)

(58) Field of Classification Search
CPC .... B60R 7/10; B60R 7/12; B60R 7/14; B60R 7/046; B60R 2011/0021; B60R 2011/0082; B60R 2011/0043; A47G 25/12; A47G 25/0607
USPC .... 224/543, 549, 553, 458, 268, 148.4, 926; 248/294.1, 308, 304, 291.1; 211/99; D6/323; D3/328; D8/367
See application file for complete search history.

(56) References Cited

U.S. PATENT DOCUMENTS

| | | | | |
|---|---|---|---|---|
| 1,200,736 | A * | 10/1916 | Laganke | F16M 11/10 248/294.1 |
| 2,071,257 | A * | 2/1937 | Hansen | A47G 25/065 224/927 |
| 3,385,547 | A * | 5/1968 | West | B60R 7/10 211/99 |
| 3,423,571 | A * | 1/1969 | Trachtenberg | A47J 41/005 219/202 |
| 4,191,350 | A * | 3/1980 | Ormond | A01K 97/04 248/311.2 |
| 4,221,354 | A * | 9/1980 | Kempkers | B60R 7/10 224/927 |
| 4,605,190 | A * | 8/1986 | Kamp | F16M 11/041 248/229.26 |
| D300,406 | S * | 3/1989 | Bordian | D8/367 |
| 5,139,222 | A * | 8/1992 | Koorey | B60N 3/102 248/315 |

(Continued)

FOREIGN PATENT DOCUMENTS

| CN | 217672412 U * | 10/2022 | |
|---|---|---|---|
| DE | 102024127645 A1 * | 4/2025 | ............ B60R 7/08 |

(Continued)

*Primary Examiner* — Justin M Larson
(74) *Attorney, Agent, or Firm* — Vichit Chea; Price Heneveld LLP

(57) ABSTRACT

A vehicle door including a trim panel located on an interior side of the door and a holder assembly coupled to the door trim panel including a ring provided on the trim panel and a rotatable hook pivotally coupled to the ring and rotatable between a stowed position within the ring and an outwardly deployed position to support an object such as a mobility assist device.

18 Claims, 4 Drawing Sheets

(56) References Cited

U.S. PATENT DOCUMENTS

| | | | | |
|---|---|---|---|---|
| D337,028 S * | 7/1993 | Koorey | ............................ | D7/620 |
| 5,328,143 A * | 7/1994 | Koorey | ................... | B60N 3/106 |
| | | | | 224/549 |
| 5,603,477 A * | 2/1997 | Deutsch | .................. | B60N 3/106 |
| | | | | 248/292.12 |
| D386,389 S * | 11/1997 | Hofman | ........................... | D8/367 |
| 5,769,294 A * | 6/1998 | Heinz | ........................ | B60R 7/02 |
| | | | | 224/927 |
| 6,095,471 A * | 8/2000 | Huang | .................... | B60N 3/102 |
| | | | | 224/400 |
| 6,131,779 A * | 10/2000 | Gendala | ..................... | A45F 5/02 |
| | | | | 248/312.1 |
| 6,427,960 B1 * | 8/2002 | Gehring | ................. | B60N 3/102 |
| | | | | 297/188.14 |
| 6,698,695 B1 * | 3/2004 | Spoto | ........................ | B60R 7/10 |
| | | | | 248/205.3 |
| 6,935,601 B2 * | 8/2005 | Tanaka | ...................... | B60R 7/10 |
| | | | | 224/927 |
| D559,561 S * | 1/2008 | Jackson | ........................... | D6/323 |
| D603,247 S * | 11/2009 | Harrell | ............................ | D8/367 |
| 7,669,821 B2 * | 3/2010 | Martin | ...................... | B60R 7/08 |
| | | | | 248/306 |
| D623,849 S * | 9/2010 | Chorazewitz | .................... | D3/215 |
| 8,052,108 B2 * | 11/2011 | Ahn | ........................... | A61B 8/00 |
| | | | | 248/314 |
| 8,066,148 B2 * | 11/2011 | Garahan | ................. | B60N 3/102 |
| | | | | 220/737 |
| D682,014 S * | 5/2013 | Gilboe | ............................ | D7/367 |
| 8,919,718 B2 * | 12/2014 | Lueker | ................ | A47G 23/0208 |
| | | | | 248/311.2 |
| 9,016,642 B1 * | 4/2015 | Ay | ........................... | F16B 45/00 |
| | | | | 248/205.1 |
| D769,024 S * | 10/2016 | Montoya | ......................... | D6/567 |
| 9,675,145 B2 | 6/2017 | O'Donohue | | |
| D831,329 S * | 10/2018 | Barahona | .......................... | D3/10 |
| 10,323,830 B2 * | 6/2019 | Adams, IV | .............. | F21V 17/16 |
| D877,485 S * | 3/2020 | Rampersaud | ..................... | D3/10 |
| 10,575,625 B2 * | 3/2020 | Senn | ......................... | A45F 5/021 |
| 10,932,601 B1 * | 3/2021 | Fan | ......................... | F16M 13/02 |
| D936,431 S * | 11/2021 | Senn | ............................. | D7/620 |
| 11,518,315 B1 * | 12/2022 | Martin | ...................... | B60R 7/08 |
| 11,654,833 B2 * | 5/2023 | Durkin | ...................... | B60R 7/10 |
| | | | | 224/543 |
| D1,005,001 S * | 11/2023 | Senn | ............................. | D6/540 |
| 2007/0090136 A1 * | 4/2007 | Stowell | ................. | A44B 11/005 |
| | | | | 224/163 |
| 2010/0012804 A1 * | 1/2010 | Egan | ......................... | F16B 9/05 |
| | | | | 248/291.1 |
| 2012/0187265 A1 | 7/2012 | Bakerman | | |
| 2017/0332771 A1 * | 11/2017 | Tandeski | ................. | A45F 5/021 |

FOREIGN PATENT DOCUMENTS

| | | |
|---|---|---|
| EP | 1688120 A1 | 8/2006 |
| JP | 6633799 B1 | 12/2019 |
| WO | WO-2023083324 A1 * | 5/2023 |

* cited by examiner

INTEGRATED HOLDER ASSEMBLY FOR A VEHICLE DOOR

FIELD OF THE DISCLOSURE

The present disclosure generally relates to vehicle doors and, more particularly, relates to a holder assembly for a vehicle door to hold an object such as a mobility assist device.

BACKGROUND OF THE DISCLOSURE

Motor vehicles are typically configured with vehicle doors that open and close to allow passengers to enter and exit the vehicle. Passengers requiring mobility assist devices, such as a walking stick, crutches, or a cane, may set aside such devices while entering and exiting the vehicle. It would be desirable to provide a convenient holder on the vehicle for temporarily holding such devices.

SUMMARY OF THE DISCLOSURE

According to a first aspect of the present disclosure, a vehicle door includes a trim panel located on an interior side of the door. A holder assembly is coupled to the door trim panel and includes a base provided on the trim panel and a rotatable hook pivotally coupled to the base and rotatable between a stowed position within the base and an outwardly deployed position to support an object.

Embodiments of the first aspect of the present disclosure can include any one or a combination of the following features:
  the base comprises a ring;
  the holder assembly further comprises a base support for supporting a lower end of the rotatable hook in the use position;
  the holder assembly rotates in a range of 30 to 90 degrees between the stowed and use positions;
  the holder rotates approximately 55 degrees between the stowed and use positions;
  the holder assembly further comprises an inner ring base located within the ring and behind the rotatable hook;
  an inner bezel coupled to the ring;
  an opening formed within the inner ring base;
  the hook pivots about a pivot axis;
  the pivot axis is provided by a pivot pin or a living hinge;
  the holder assembly is integrated with the trim panel;
  the holder assembly is integrally formed with the trim panel; and
  the hook comprises a C-shaped hook configured to support a mobility assist device.

According to a second aspect of the present disclosure, a holder assembly for a vehicle door includes a ring configured to be coupled to a trim panel in the vehicle door and a rotatable hook pivotally coupled to the ring and rotatable between a stowed position within the ring and an outwardly deployed position to support an object.

Embodiments of the second aspect of the present disclosure can include any one or a combination of the following features:
  the holder assembly includes a ring base support for supporting a lower end of the rotatable hook in the use position;
  the holder assembly rotates in a range of 30 to 90 degrees between the stowed and use positions; and
  the holder assembly comprises a C-shaped hook configured to support a mobility assist device.

According to a third aspect of the present disclosure, a vehicle includes a cabin interior, a seating arrangement provided in the cabin interior, a vehicle door located proximate to the seating arrangement, a trim panel located on an interior side of the door and a holder assembly integrated into the door trim panel. The holder assembly includes a ring provided in the trim panel, and a rotatable hook pivotally coupled to the ring and rotatable between a stowed position within the ring and an outwardly deployed position to support an object.

Embodiments of the third aspect of the present disclosure can include any one or a combination of the following features:
  the holder assembly includes a ring base support for supporting a lower end of the rotatable hook in the use position; and
  the holder assembly rotates in a range of 30 to 90 degrees between the stowed and use positions.

These and other features, advantages, and objects of the present disclosure will further be understood and appreciated by those skilled in the art by reference to the following specification, claims, and appended drawings.

DETAILED DESCRIPTION OF PREFERRED EMBODIMENTS

Figure 1:
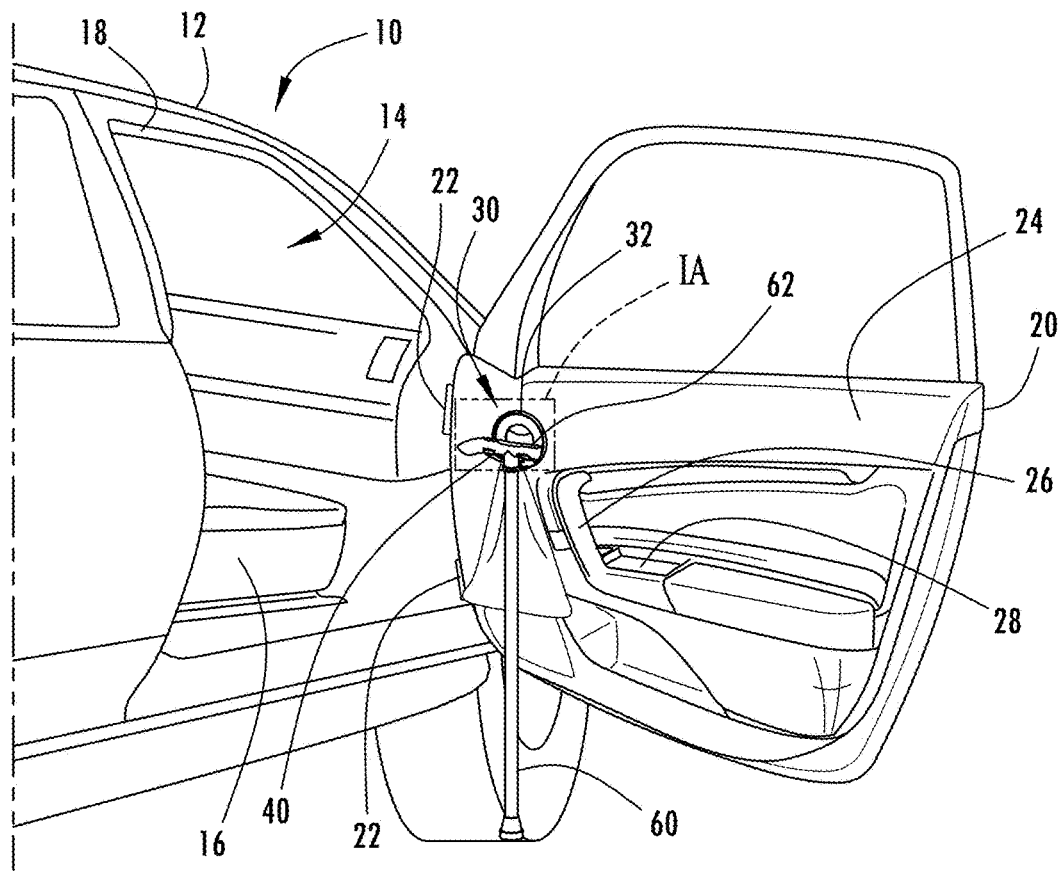
FIG. 1 is a rear side perspective view of a motor vehicle equipped with a door shown in the open position and having a holder assembly, shown holding a mobility assist device in the form of a walking stick, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle door and holder assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or endpoint referred to. Whether or not a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated equipped with a deployable holder assembly 30, according to one embodiment. The motor vehicle 10 has a vehicle body 12 that generally defines a cabin interior 14. The cabin interior 14 is configured with passenger seating including at least a vehicle seat assembly 16 such as a driver's seat and a passenger's seat for transporting a user (e.g., person) such as a driver or passenger in the motor vehicle 10. The cabin interior 14 is encapsulated by the vehicle body 12 which may include one or more door openings 18 that may be exposed when a door operatively coupled thereto is in an open position to allow one or more users to enter or exit the vehicle 10 and may be closed when the door 20 is in the closed position. The arrangement of seating may include a driver's seat in a front row on one side and forward of the steering wheel assembly and a passenger's seat on an opposite lateral side in the front row of the motor vehicle 10. The motor vehicle 10 may also include one or more rear seats defining additional rows of seating which may include one or more seat assemblies. Each row of seating in the vehicle 10 may generally be aligned with or accessible to a door opening on each lateral side the body 12 to allow ingress and egress to the vehicle cabin interior 14. The motor vehicle 10 may have other numbers of rows of seating or seat assemblies and doors as may exist for large SUVs, vans, buses, etc. It should be appreciated that the vehicle 10 may be a motor vehicle, such as a wheeled car, truck, SUV, van, or bus, for example, or another vehicle capable of transporting one or more passengers.

The vehicle door 20 may include a pivoting door 20 shown having a pair of hinges 22 located at a forward end thereof that allows the door 20 to swing between the open position shown in FIG. 1 and the closed position closing the door opening 18. Passengers that are mobility challenged may require the assistance of a mobility assist device 60, such as a walking stick, a cane, or crutches, for example. In order to assist a mobility-challenged passenger with entering and exiting the motor vehicle 10, the vehicle door 20 is advantageously equipped with a deployable holder assembly 30 that is shown deployed in the use position in FIG. 1 holding a mobility assist device 60 in the form of a walking stick or cane, according to one example. This allows for the user to place the mobility assist device 60 on the holder assembly 30 to stably support the mobility assist device 60 and prevent the mobility assist device 60 from falling over or otherwise not being easily accessible. It should further be appreciated that other objects may be held on the holder device, such as a purse or a bag, for example.

The vehicle door 20 is shown having a trim panel 24 located on the interior side of the vehicle door 20 generally facing the cabin interior 14. The trim panel 24 may include a single or multiple trim panels that may be integrated with or coupled to a door handle 26 and latch assembly 28, for example. The trim panel 24 may be an injected-molded polymeric material that is formed into the shape of the trim panel 24 and integrally includes the holder assembly 30, according to one embodiment. As seen in FIG. 1, the holder assembly 30 may be formed as part of the trim panel 24 and may be assembled to the interior side of the door 20 as a single unit. Alternatively, the holder assembly 30 may be formed as a separate unit that is assembled to the trim panel 24 on the interior side of the door 20.

Figure 1A:
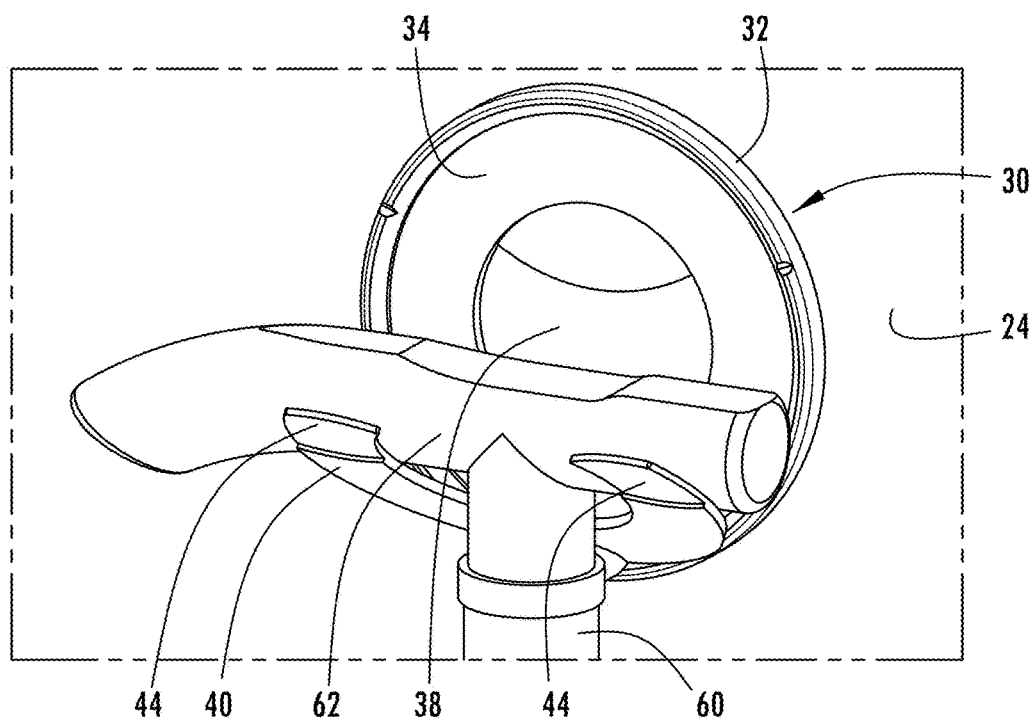
FIG. 1A is an enlarged view of section IA of FIG. 1 further illustrating the holder assembly in a use position and supporting the mobility assist device.

In the example shown in FIGS. 1 and 1A, the mobility assist device 60 is shown configured as a walking stick having an upright support post and a handle 62 at the top end that may rest upon a hook 40 of the deployed holder assembly 30 when the holder assembly 30 is in a use position. It should further be appreciated that the C-shaped hook 40 may not only support the mobility assist device 60 vertically but may provide a lateral sidewall support to hold the mobility assist device 60 or other objects.

Figure 2:
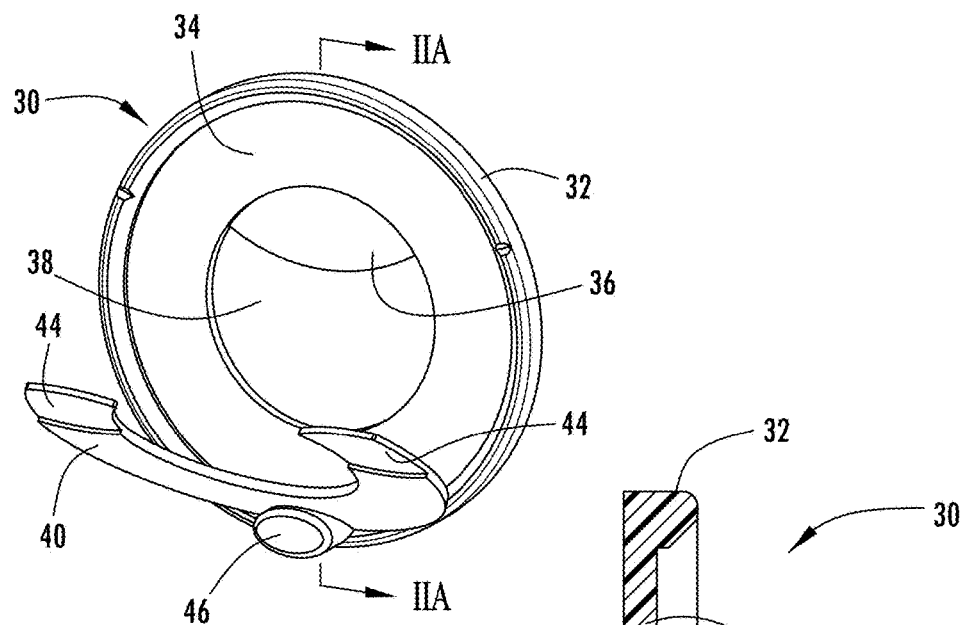
FIG. 2 is a front perspective view of the holder assembly illustrated in the use position configured to receive an object, such as a mobility assist device.
Figure 2A:
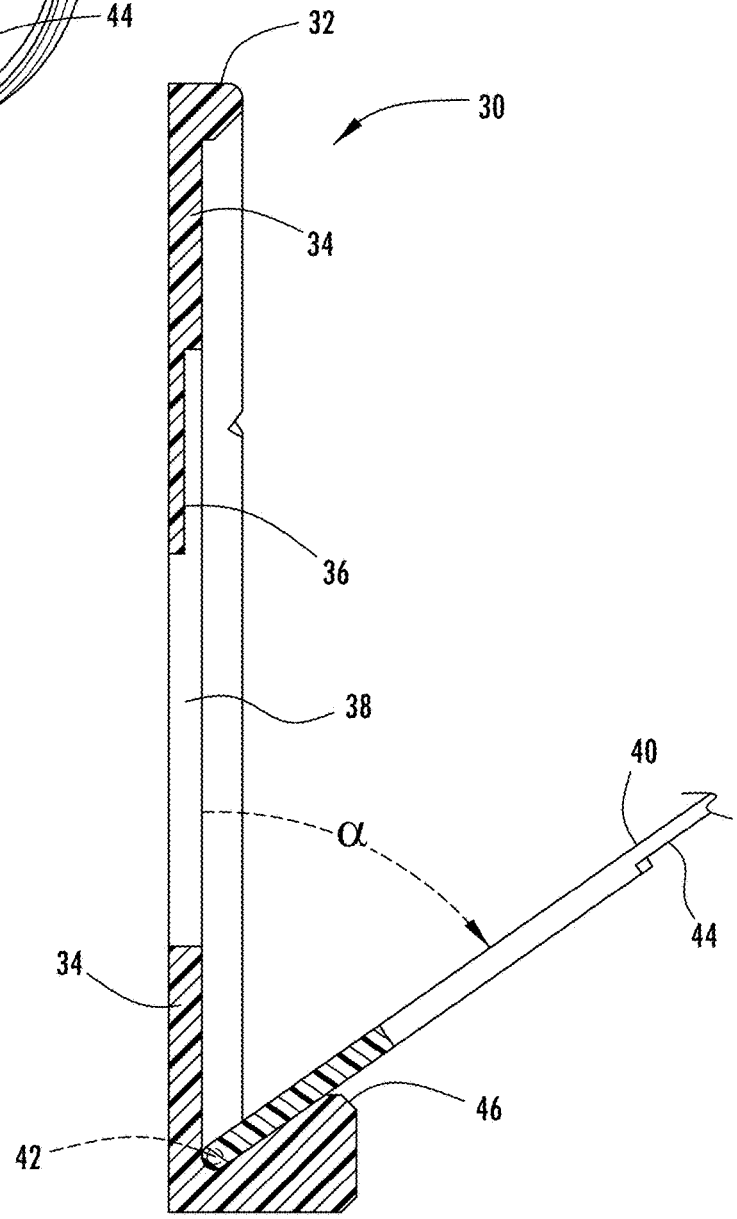
FIG. 2A is a cross-sectional view taken through line IIA-IIA of FIG. 2 further illustrating the holder assembly in the use position.
Figure 3:
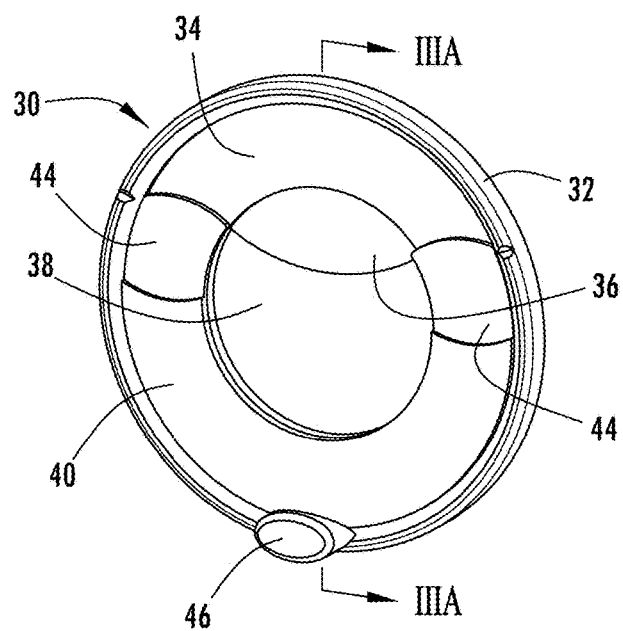
FIG. 3 is a front perspective view of the holder assembly illustrated in a stowed position.
Figure 3A:
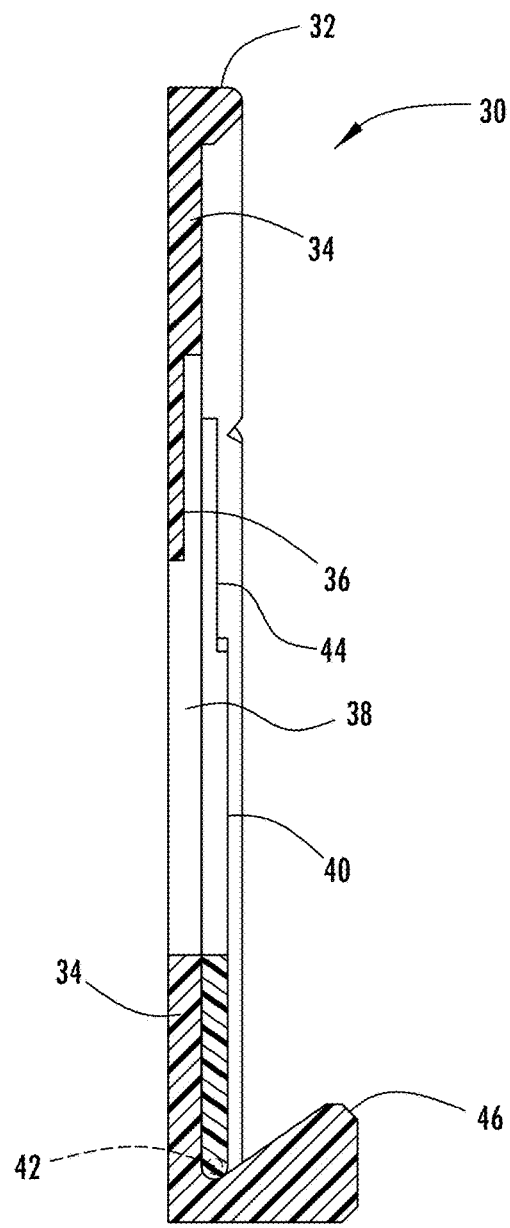
FIG. 3A is a cross-sectional view taken through line IIIA-IIIA of FIG. 3 further illustrating the holder assembly in the stowed position.

The holder assembly 30 is illustrated in FIGS. 2 and 2A in a deployed use position and is further illustrated in FIGS. 3 and 3A in a stowed position. The holder assembly 30 includes a base in the form of a ring 32 that generally defines the outer perimeter of the holder assembly 30. The ring 32 may be integrally formed with the trim panel 24 of the vehicle door 20 according to one embodiment. Disposed within the ring 32 is an inner ring base 34 having a ring shape and defining a central opening 38. An inner bezel 36 extends across an upper portion of the central opening 38.

The holder assembly 30 includes a rotatable hook 40 that rotates relative to the inner ring base 34 between the use position and the stowed position. The hook 40 has a C-shape with reduced thickness ends 44, as shown according to one example. The hook 40 may have a U-shape according to another example. The C-shaped hook 40 is coupled to a ring base support 46 on a bottom side thereof. The ring base support 46 defines a supporting structure at an angle α that defines the extremely rotated position of the hook 40 in the deployed use position. As such, the hook 40 may rotate forward and downward by an angle α between the use position and the stowed position. According to one embodiment, the rotation angle α may be in a range of 30 to 90 degrees, and more particularly in a range of 45 to 75 degrees. According to one example, the angle α may be approximately 55 degrees. In the use position, the rotatable C-shaped hook 40 may support an object hanging from the hook 40 and the central opening 38 of the hook 40 may support an object laterally with the inner side walls of the C-shaped hook 40, such as a mobility assist device 60 in the form of a walking stick, or a cane, for example. As such, with the C-shaped hook 40 extending outward in the use position, the central opening 38 of the hook 40 may temporarily hold an object in a position to allow a user to conveniently gain access to the object, particularly when entering or exiting the motor vehicle 10 with the door 20 open.

The deployable C-shaped book 40 is operatively coupled to the inner ring base 34 via a pivoting connection 42 that defines a horizontal pivot axis. In one embodiment, the pivoting connection 42 may be a living hinge which is a reduced portion thickness of the hook 40 at the interface with base 34. As such the hook 40 may pivot about the living hinge between the stowed and use positions. According to another embodiment, the hook 40 may pivot relative to the base with force via a pivot pin that defines the pivot connection 42.

In operation, when the vehicle door 20 is in an open position, a user may pull on an outer portion of the rotatable C-shaped hook 40 to disengage the friction connection of the hook 40 from the inner ring base 34 and ring 32 and rotate and extend the hook 40 outward such that it rests on the ring base support 46 to the use position as seen in FIGS. 2 and 2A. In this use position, a user may place an object, such as a mobility assist device or other object either on the hook 40 or within the opening formed in the hook 40 such that the hook 40 supports the object temporarily. Once a user has removed the object from the hook 40, the user may forcibly depress or push the hook 40 inward into the inner ring base 34 until the peripheral portions of the hook 40 frictionally engage the inner ring base 34 to maintain the hook 40 in the stowed position, as seen in FIGS. 3 and 3A.

Figure 4:
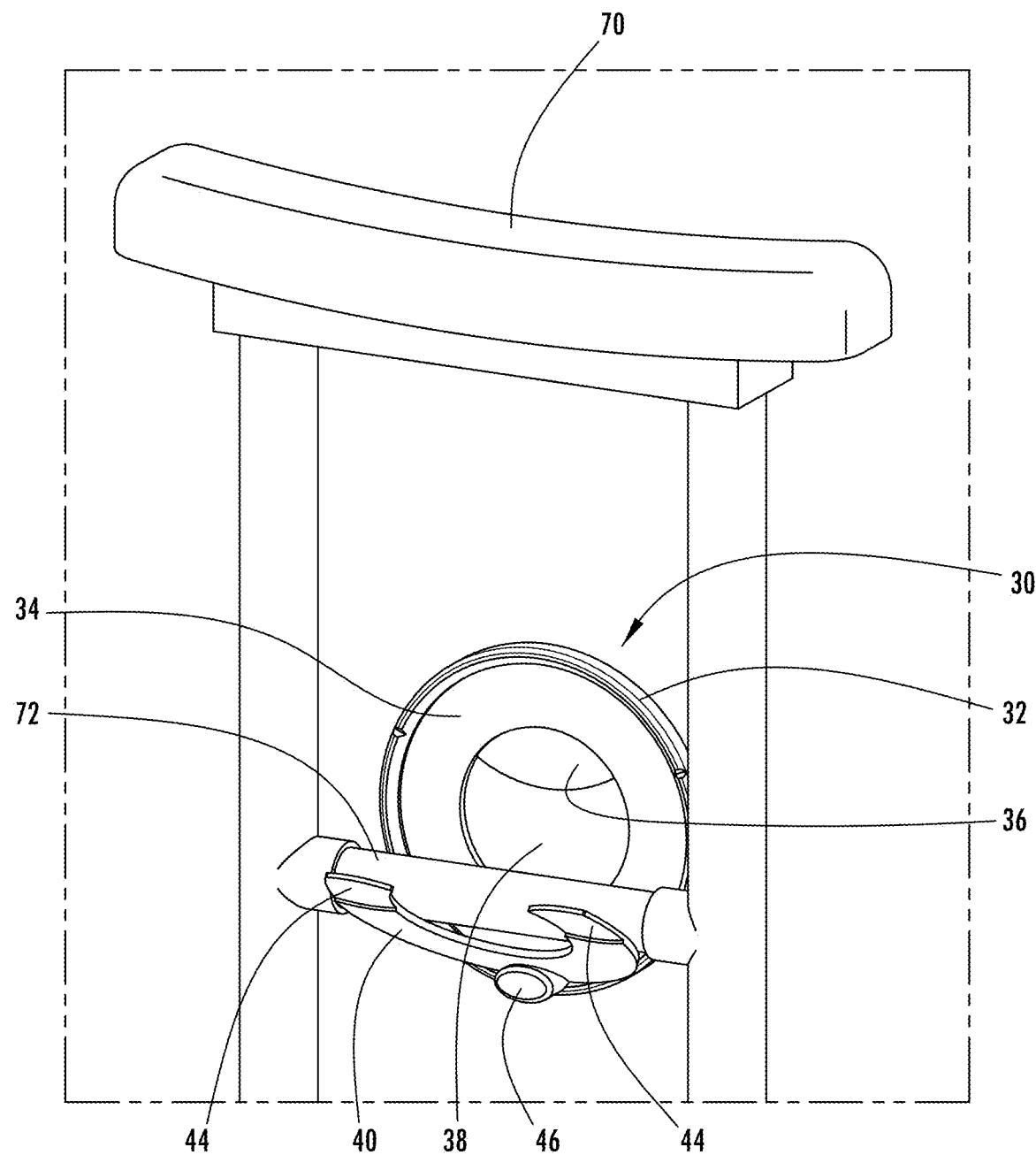
FIG. 4 is a perspective view of the holder assembly illustrated in a use position supporting a mobility assist device in the form of a crutch, according to another example.

Referring to FIG. 4, a mobility assist device in the form of a crutch 70 is shown supported on the holder assembly 30 in the use position. In this example, the crutch 70 may include a handle 72 that may be supported on the hook 40. It should otherwise be appreciated that other portions of the crutch 70, such as the vertical legs, may be supported at least laterally within the central opening 38 of the hook 40 such that the weight is not applied downward, but the object is laterally supported by the inner wall of the C-shaped hook 40 instead. It should further be appreciated that the user may place a purse, or one or more bags, on the book 40 in the use position, according to other examples.

The holder assembly 30 may advantageously be integrated into the vehicle door trim panel 24 on the vehicle door 20 and may be easily operated by a user to a deployed position to assist with holding an object such as a mobility assist device while entering or exiting the motor vehicle 10. It should be appreciated that the holder assembly 30 may be used to support an object such as a mobility assist device when the vehicle door 20 is open and the motor vehicle 10 is stopped and in park.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle door comprising:
   a trim panel located on an interior side of the door; and
   a holder assembly coupled to the door trim panel and comprising:
   a base provided on the trim panel, the base including a ring, an inner ring base, and a ring base support extending forward from the inner ring base with an inclined surface; and
   a rotatable hook pivotally coupled to the base and rotatable between a stowed position within the base and an outwardly deployed position supported on the inclined surface of the ring base support to support an object, wherein the rotatable hook rotates between the stowed position and the outwardly deployed position by an angle in the range of 45 to 75 degrees, and the rotatable hook has a C-shape or U-shape with a pair of terminal ends and a pivot connection provided midway between the pair of terminal ends onto the base such that the pair of terminal ends of the rotatable hook extend outward from the base in an outwardly deployed position, and wherein the terminal ends are free ends configured to hold the object without using connectors.

2. The vehicle door of claim 1, wherein the holder rotates approximately 55 degrees between the stowed and use positions.

3. The vehicle door of claim 1, wherein the holder assembly is integrated with the trim panel.

4. The vehicle door of claim 1, wherein the holder assembly is integrally formed with the trim panel.

5. The vehicle door of claim 1, wherein the hook comprises a C-shaped hook configured to support a mobility assist device.

6. The vehicle door of claim 1, wherein the hook pivots about a pivot axis.

7. The vehicle door of claim 6, wherein the pivot axis is provided by a pivot pin or a living hinge.

8. The vehicle door of claim 1, wherein the base comprises a ring.

9. The vehicle door of claim 8, wherein the inner ring base is located within the ring and behind the rotatable hook.

10. The vehicle door of claim 9 further comprising an inner bezel coupled to the ring.

11. The vehicle door of claim 10 further comprising an opening formed within the inner ring base.

12. A holder assembly for a vehicle door, the holder assembly comprising:
a base including a ring, an inner ring base, and a ring base support extending forward from the inner ring base with an inclined surface, wherein the ring is configured to be coupled to a trim panel in the vehicle door; and
a rotatable hook pivotally coupled to the ring and rotatable between a stowed position within the ring and an outwardly deployed position supported on the inclined surface of the ring base support to support an object, wherein the rotatable hook rotates between the stowed position and the outwardly deployed position by an angle in the range of 45 to 75 degrees, and the rotatable hook has a C-shape or U-shape with a pair of terminal ends and a pivot connection provided midway between the pair of terminal ends onto the base such that the pair of terminal ends of the rotatable hook extend outward from the base in an outwardly deployed position, and wherein the terminal ends are free ends configured to hold the object without using connectors.

13. The holder assembly for a vehicle door of claim 12, wherein the holder assembly comprises a C-shaped hook configured to support a mobility assist device.

14. The holder assembly for a vehicle door of claim 12, wherein the holder assembly further comprises a ring base support for supporting a lower end of the rotatable hook in the outwardly deployed position.

15. The holder assembly for a vehicle door of claim 14, wherein the holder assembly rotates approximately 55 degrees between the stowed position and the outwardly deployed position.

16. A vehicle comprising:
a cabin interior;
a seating arrangement provided in the cabin interior;
a vehicle door located proximate to the seating arrangement;
a trim panel located on an interior side of the door; and
a holder assembly integrated into the door trim panel and comprising:
a base including a ring, an inner ring base, and a ring base support extending forward from the inner ring base with an inclined surface, wherein the ring is provided in the trim panel; and
a rotatable hook pivotally coupled to the ring and rotatable between a stowed position within the ring and an outwardly deployed position supported on the inclined surface of the ring base support to support an object, wherein the rotatable hook rotates between the stowed position and the outwardly deployed position by an angle in the range of 45 to 75 degrees, and the rotatable hook has a C-shape or U-shape with a pair of terminal ends and a pivot connection provided midway between the pair of terminal ends onto the base such that the pair of terminal ends of the rotatable hook extend outward from the base in an outwardly deployed position, and wherein the terminal ends are free ends configured to hold the object without using connectors.

17. The vehicle of claim 16, wherein the holder assembly further comprises a ring base support for supporting a lower end of the rotatable hook in the outwardly deployed position.

18. The vehicle claim 17, wherein the holder assembly rotates approximately 55 degrees between the stowed position and the outwardly deployed position.

* * * * *